United States Patent
Sawut et al.

(10) Patent No.: US 7,406,950 B2
(45) Date of Patent: Aug. 5, 2008

(54) FUEL SUPPLY APPARATUS OF ENGINE

(75) Inventors: Umerujan Sawut, Atsugi (JP); Masashi Iwasaki, Atsugi (JP); Shinya Yamaguchi, Atsugi (JP)

(73) Assignee: Nikki Co., Ltd. (JP)

( * ) Notice: Subject to any disclaimer, the term of this patent is extended or adjusted under 35 U.S.C. 154(b) by 0 days.

(21) Appl. No.: 11/727,041

(22) Filed: Mar. 23, 2007

(65) Prior Publication Data

US 2007/0246020 A1 Oct. 25, 2007

(30) Foreign Application Priority Data

Apr. 19, 2006 (JP) ............................. 2006-115667

(51) Int. Cl.
*F02M 37/08* (2006.01)

(52) U.S. Cl. ....................... 123/497; 123/446; 123/525; 123/458

(58) Field of Classification Search ................. 123/446, 123/497, 525, 527, 458

See application file for complete search history.

(56) References Cited

U.S. PATENT DOCUMENTS

| | | | | |
|---|---|---|---|---|
| 4,926,829 A | * | 5/1990 | Tuckey | 123/497 |
| 5,033,444 A | * | 7/1991 | Kaufman et al. | 123/527 |
| 5,044,344 A | * | 9/1991 | Tuckey et al. | 123/497 |
| 5,085,193 A | * | 2/1992 | Morikawa | 123/458 |
| 5,237,975 A | * | 8/1993 | Betki et al. | 123/497 |
| 5,284,119 A | * | 2/1994 | Smitley | 123/497 |
| 5,377,645 A | * | 1/1995 | Moore | 123/525 |
| 5,398,655 A | * | 3/1995 | Tuckey | 123/456 |
| 5,479,906 A | * | 1/1996 | Collie | 123/525 |
| 5,623,907 A | * | 4/1997 | Cotton et al. | 123/456 |
| 5,755,211 A | * | 5/1998 | Koch | 123/525 |
| 5,775,281 A | * | 7/1998 | Smith | 123/179.8 |
| 5,857,448 A | * | 1/1999 | Ofner et al. | 123/525 |
| 5,967,126 A | * | 10/1999 | Ofner | 123/525 |
| 6,314,947 B1 | * | 11/2001 | Roche | 123/525 |
| 6,446,616 B1 | * | 9/2002 | Kabat et al. | 123/527 |
| 6,591,817 B2 | * | 7/2003 | Deutsch | 123/525 |
| 6,698,401 B2 | * | 3/2004 | Suzuki et al. | 123/516 |

* cited by examiner

*Primary Examiner*—Thomas N Moulis
(74) *Attorney, Agent, or Firm*—Rader Fishman & Grauer PLLC

(57) ABSTRACT

The invention can avoid an energy dissipation and a consumption of an apparatus by minimizing a driving amount of a fuel pump and maintain an improved fuel supply state, in a fuel supply system injecting a liquefied gas fuel by an injector and supplying to an engine. In a return-less type engine fuel supply apparatus provided with a fuel supply pipe line (9) extended from a fuel tank (2) and having an injector (8) in a leading end side, a motor-driven fuel pump (3), and an electronic control unit (12) drive controlling the fuel pump (3) and the injector (8), a pressure sensor (13) detecting a fuel pressure so as to output to the electronic control unit (12) is arranged at a position near the injector (8) in the fuel supply pipe line (9) where a fuel pressure approximately coincides with a fuel injection pressure, the electronic control unit feedback controls the operation of the fuel pump (3) on the basis of the detected fuel pressure in such a manner that the fuel injection pressure maintains a predetermined target pressure, and the fuel pump (3) is arranged outside an engine room (50).

4 Claims, 4 Drawing Sheets

FUEL SUPPLY APPARATUS OF ENGINE

DETAILED DESCRIPTION OF THE INVENTION

1. Technical Field

The present invention relates to a fuel supply apparatus pressure feeding a liquid fuel such as an LPG or a DME which tends to be evaporated in comparison with a gasoline in a liquid state to an injector from a fuel tank so as to supply to an engine.

2. Background Art

There has been well known a system supplying the liquid fuel such as the LPG or the DME which tends to be evaporated in comparison with the gasoline in the liquid state after weighing and injecting by the injector. As shown in FIG. 3, there is generally employed a return type fuel supply system structured such that a fixed amount of liquefied gas fuel stored in a fuel tank 20 is always pressure fed by a motor-driven type fuel pump 30 driven by a DC motor or the like, an engine demand flow rate of fuel is supplied from an injector 8 via a fuel delivery pipe line 9 after being adjusted to a fixed pressure by a relief valve 40, and a surplus fuel is returned to the fuel tank 20 by a fuel return pipe line 90 via a pressure regulator 41.

In the fuel supply system mentioned above, in order to correspond to every operating condition of the engine, a discharge flow rate of the fuel pump 30 is set to be equal to or more than a maximum fuel amount injected from the injector 8. However, in a condition in which a fuel injection amount of the injector 8 is extremely small, for example, an idling period, a fuel cut time or the like, since most of the delivered fuel is returned to the fuel tank 20 from the pressure regulator 41, an energy (an electric power) applied to the fuel pump 30 is unnecessarily consumed. Further, if the surplus fuel passing near the engine 10 and coming to a high temperature is returned to the fuel tank 20 at a large quantity, there is generated a disadvantage that a fuel temperature within the tank is increased, and a fuel vapor is generated so as to make a pump discharge amount unstable.

Accordingly, as described in Japanese Unexamined Patent Publication No. 7-54725, there can be considered a method of reducing an electric power consumption and a surplus fuel returning to the fuel tank by switching the pump discharge amount between two stages comprising a normal operation and a high zone. However, since it is impossible to accurately correspond to the fuel demand flow rate which is changed finely or widely in correspondence to an operation state of the engine, on the basis of the coarse control mentioned above, it is not sufficient to reduce the waste of the electric power consumption as well as it is impossible to sufficiently reduce the surplus fuel.

On the other hand, with regard to the gasoline engine, there has been known a method of determining a flow rate of a fuel supplied to the injector 8 on the basis of an opening and closing timing of a spill valve 31 additionally provided in a high-pressure fuel pump 33 in correspondence to an operation timing of a plunger, in the case of pressurizing the gasoline stored in a fuel tank 23 by a low-pressure fuel pump 32 so as to deliver to an engine 11 through a fuel supply pipe line 9 as shown in FIG. 4. A return-less type fuel supply system in which the delivered fuel is set minimum is achieved by employing the method mentioned above. Accordingly, there can be considered to employ this system for a fuel supply system using the liquefied gas fuel which tends to be evaporated in comparison with the gasoline.

However, since a driving source of the high-pressure fuel pump 33 utilizes a rotating force of the engine, and a pump main body is additionally provided in the engine 11, the fuel is exposed to a heat transmitted from the engine 11 and a high-temperature atmosphere of an engine room 50. Accordingly, there is a case that the fuel is vaporized in a low pressure portion in an upstream side of the high-pressure fuel pump 33 in the case of employing the liquefied gas fuel which tends to be evaporated in comparison with the LPG, the DME or the like. As a result, the fuel delivery backs up, it is hard to execute an A/F control, and there is generated a trouble such as a deterioration of an exhaust state or the like.

Further, in this case, since the plunger of the high-pressure fuel pump 33 keeps on moving constantly in correspondence to the rotation of the engine, an abrasion of a slidable portion such as a plunger, a cylinder or the like tends to be promoted in comparison with the case of using the gasoline in the case of using the liquid fuel having a low viscosity such as the LPG, the DME or the like. Accordingly, there is generated a problem that a short service life of the fuel pump is caused.

DISCLOSURE OF THE INVENTION

Technical Problem

The present invention aims to solve the problem mentioned above, and an object of the present invention is to secure a durability of a fuel supply system while avoiding an energy dissipation by minimizing a driving amount of a fuel pump and maintain an improved fuel supply state, in the fuel supply system weighing and injecting a liquefied gas fuel such as an LPG or a DME which tends to be evaporated in comparison with a gasoline, by an injector and supplying to an engine.

Means for Solving the Problem

In order to solve the problem mentioned above, in accordance with the present invention, there is provided a return-less type engine fuel supply apparatus comprising a fuel supply pipe line extended from a fuel tank and having an injector in a leading end side, a motor-driven fuel pump arranged in the fuel supply pipe line, and an electronic control unit drive controlling the fuel pump and the injector, and pressurizing a liquefied gas fuel stored in the fuel tank by the fuel pump so as to feed to the injector through the fuel supply pipe line and supply to the engine, wherein a pressure sensor detecting a fuel pressure so as to output to the electronic control unit is arranged at a position near the injector in the fuel supply pipe line where a fuel pressure approximately coincides with a fuel injection pressure, the electronic control unit feedback controls the operation of the fuel pump on the basis of the detected fuel pressure in such a manner that the fuel injection pressure maintains a predetermined target pressure, and the fuel pump is arranged outside an engine room.

As mentioned above, since the fuel supply apparatus is structured such that the return-less type fuel supply system is constructed such as to prevent the heated fuel from being again returned to the fuel tank, and the electronic control unit precisely controls the driving of the fuel pump in such a manner as to maintain the predetermined fuel injection pressure while monitoring the fuel pressure by the pressure sensor arranged at the position near the injector, it is possible to reduce the temperature increase within the fuel tank while stably maintaining the fuel injection pressure, and it is possible to suppress the driving of the fuel pump to the minimum. In addition, since the fuel pump is arranged outside the engine room, it is possible to securely avoid the disadvantage that the liquefied fuel in the upstream side of the fuel pump is vaporized by the heat caused by the engine.

Advantage of the Invention

In accordance with the present invention in which the fuel pump is arranged outside the engine room as well as executing the feedback control form maintaining the fuel injection pressure within the predetermined range, it is possible to reduce the consumption of the fuel pump while minimizing the driving amount of the fuel pump so as to avoid the dissipation of the energy, and it is possible to avoid vaporization of the fuel in the upstream side of the fuel pump so as to maintain an improved fuel supply state.

BEST MODE FOR CARRYING OUT THE INVENTION

A description will be in detail given below of a best mode for carrying out the present invention with reference to the accompanying drawings.

Figure 1:
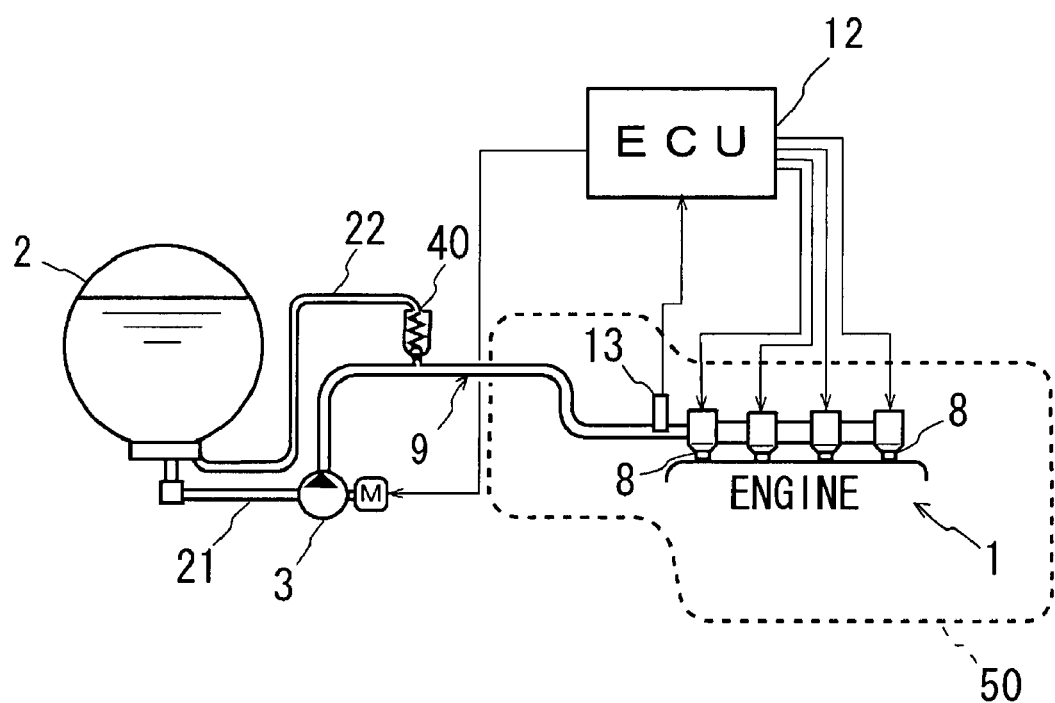
FIG. 1 is a layout view showing an embodiment in accordance with the present invention.

FIG. 1 shows a layout view of a fuel supply system provided with an engine fuel supply apparatus in accordance with the present embodiment. An electric motor driven type fuel pump 3 is arranged close to an outlet of a fuel tank 2 of a fuel supply pipe line 9 extended from the fuel tank 2, and a leading end side of the fuel supply pipe line 9 is connected to a fuel rail 6 in which a plurality of injectors 8 additionally provided in an engine (not shown) are arranged, thereby constructing a return-less type fuel supply system provided with no fuel return pipe line in a downstream side of the fuel rail 6.

A piping 22 provided with a relief valve 40 is branched in a downstream side of the fuel pump 3 so as to be connected to the fuel tank 2, thereby adjusting a pressure of a fuel delivered from the fuel pump 3. Further, the fuel pump 3 and each of the injectors 8 are connected to an electronic control unit 12, and are respectively drive controlled in correspondence to an engine operation state.

Further, a pressure sensor 13 detecting a fuel pressure is arranged near the injector 8 (near an inlet of the fuel rail 6) of the fuel supply pipe line 9, thereby outputting a detected signal to the electronic control unit 12. Further, the electronic control unit 12 is structured such as to continuously monitor the detected signal of the pressure sensor 13 and feedback control in such a manner that the fuel pressure just before the injector approximately coinciding with the fuel injection pressure comes to a previously determined target pressure, and is structured such as to change a driving output of the fuel pump 3 so as to adjust a discharge amount, and maintain an approximately constant fuel injection pressure, thereby constituting a first feature portion of the present invention. In this case, the feedback control can be comparatively easily executed by arranging a control program executing predetermined procedure and calculating method utilizing a well-known control theory such as a PID control, a modern control theory or the like so as to be stored in a memory means of a general-purpose electronic control unit.

Figure 4:
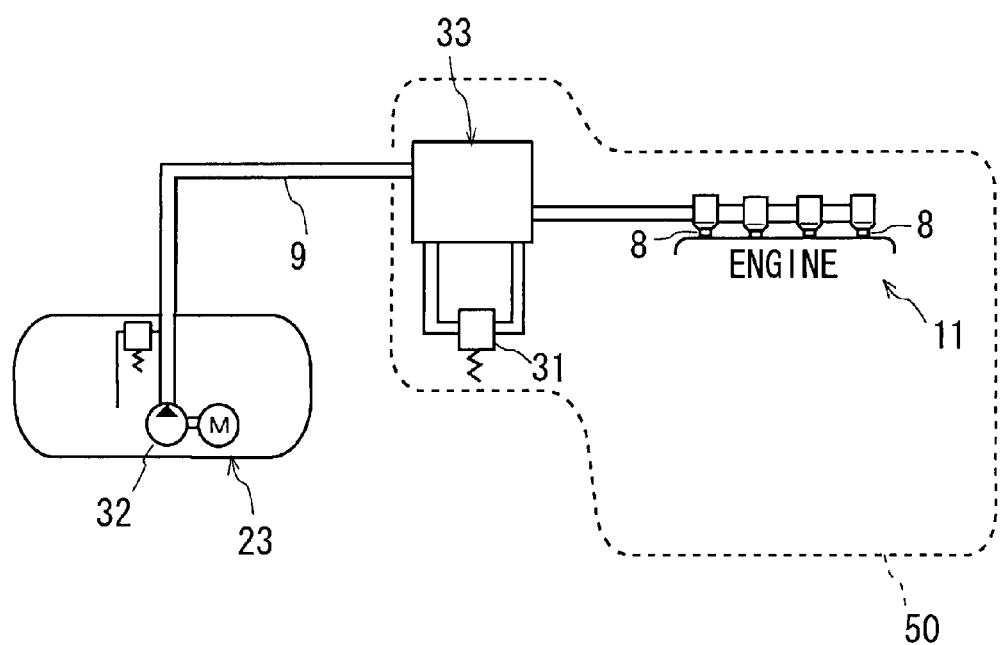
FIG. 4 is a layout view showing a gasoline supply apparatus in accordance with a prior art.

Further, the high-pressure fuel pump 33 of the gasoline fuel supply apparatus in FIG. 4 is arranged within an engine room 50 (additionally provided in the engine 11) shown by a broken line, in relation to utilization of the driving force of the engine 11, however, the fuel pump 3 is arranged at the position outside the engine room 50, for example, within a trunk room near the fuel tank 2 in the loading vehicle in the present embodiment because the fuel pump 3 does not utilize the driving force of the engine 1, thereby constituting a second feature of the present invention. Accordingly, it is hard to be affected by the heat caused by the engine, and it is possible to easily avoid the trouble that the fuel is vaporized in the low pressure portion before the fuel pump 3 and the fuel is hard to be delivered.

Further, in cooperation with the arrangement of the fuel pump 3 at the position away from the engine 1, a portion corresponding to a pressurizing piping of the fuel supply pipe line 9 from the fuel pump 3 to the injector 8 is structured such as to have a shape having a relation piping length (L)=piping inner diameter (d)×250 or more. Since the shape of the pressurizing piping is set such that a volumetric capacity is comparatively large and a pressurizing distance is elongated, it is possible to increase an elastic modulus of the fuel in an inner portion thereof, it is easy to attenuate a width of a pulsation (a pressure fluctuation), and it is easy to secure a stable fuel injection pressure. In this case, the relation between the piping length (L) and the piping inner diameter (d) is obtained as a result of experimentations of the inventors of the present invention. In other words, the inventors experiment in accordance with the various rates, and the elastic modulus is suddenly improved and a sufficient pulsation attenuation is exhibited in the case that the piping length (L) equal to or more than the rate mentioned above is employed.

Figure 2:
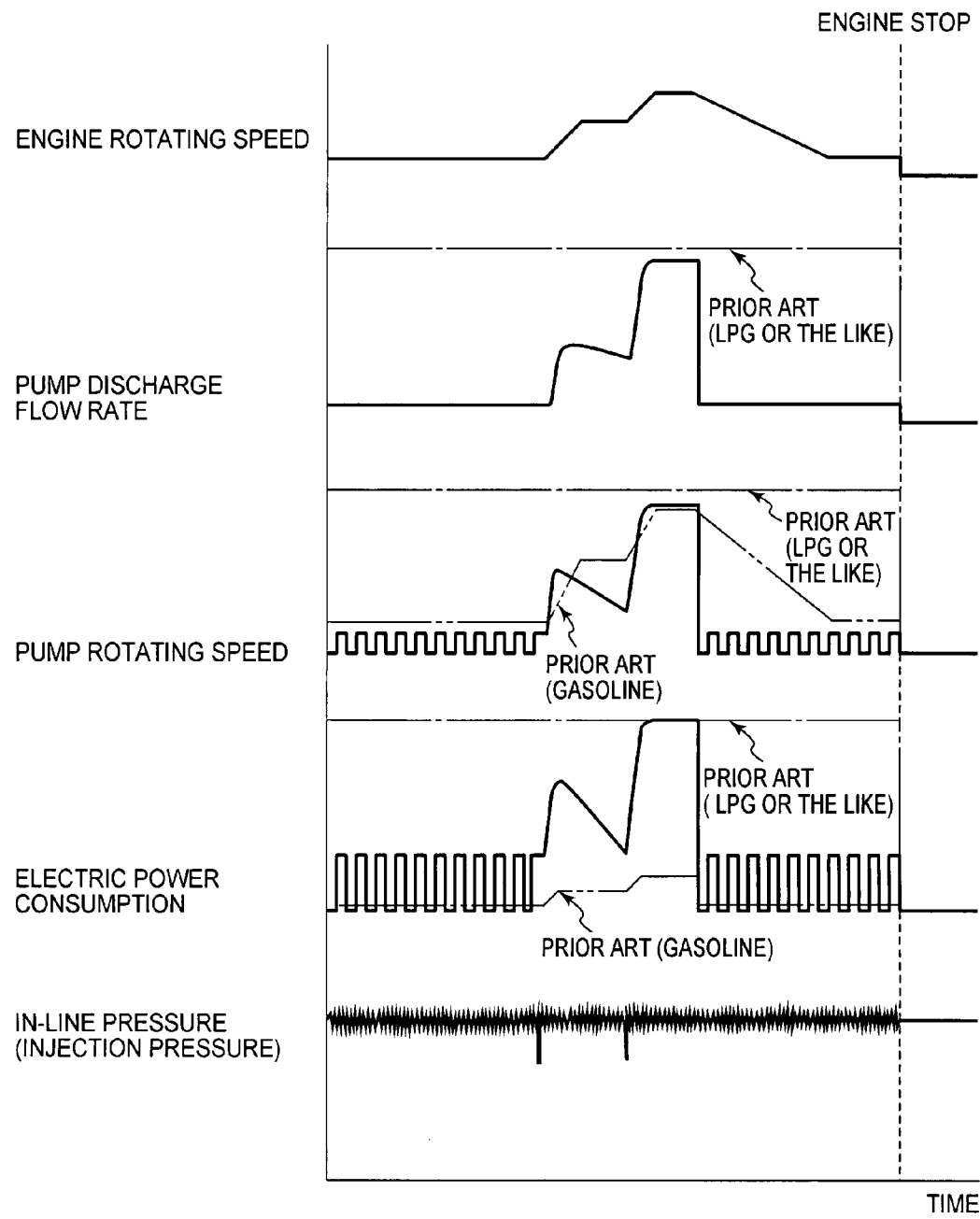
FIG. 2 is each of waveform charts for explaining an operation of a fuel supply apparatus in FIG. 1.
Figure 3:
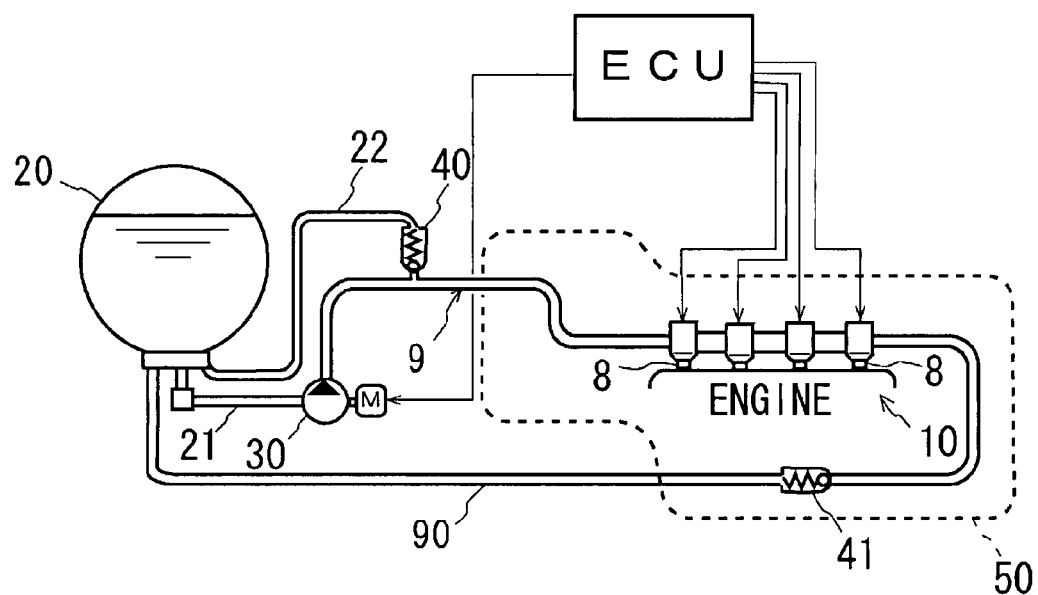
FIG. 3 is a layout view showing a liquefied gas fuel supply apparatus in accordance with a prior art.

Next, a description will be given further in detail of the feature of the operation with reference to FIG. 2 showing a graph of each of data in the engine fuel supply apparatus in accordance with the present embodiment.

Referring to the graph of an in-line fuel pressure detected by the pressure sensor 13, since the output of the fuel pump 3 is controlled by the electronic control unit 12 in such a manner as to come to a feedback target pressure which is set slightly lower than the detected pressure of the pressure sensor 13, a slight vertical motion exists in the pressure value, however, the output maintains approximately the target pressure.

Viewing a relation between an engine rotating speed and a driven condition of the fuel pump 3 at this time, the pump rotating speed getting to the high speed rotation is lowered approximately vertically in accordance that the engine rotating speed is lowered little by little after reaching a peak, and a pump discharge flow rate and a pump electric power consumption come down in the same manner. On the other hand, the conventional return type liquefied gas fuel supply apparatus shown by a one-dot chain line as a reference example always maintain fixed rotating speed, pump discharge flow rate and electric power consumption at a comparatively high level.

In other words, in order to correspond to the maximum demand flow rate of the engine, the conventional return type liquefied gas fuel supply apparatus is always set to a pump driving amount securing a fuel flow rate equal to or more than the maximum demand flow rate of the engine, and maintains the extremely great electric power consumption and pump rotating speed. However, the present embodiment is set to the fuel discharge amount which can only maintain the fuel pressure just before the injection which fluctuates in accordance with the fluctuation of the engine rotating speed, and has the feature in a point that the minimum pump rotating speed (amount) and electric power consumption is achieved.

Accordingly, in addition to the fact that the stable fuel supply can be achieved without employing the return type fuel supply system, it is possible to suppress the driving amount of the fuel pump 3 to the minimum, and it is possible to effectively avoid the wasteful electric power consumption. Further, since the pump driving amount comes to the minimum, the abrasion in the slidable portion is reduced even in the case of using the liquefied gas fuel such as the LPG, the DME or the like having the lower viscosity than the gasoline, it is possible to avoid the short service life of the apparatus, and an improved fuel supply capacity can be easily maintained over a long period.

In this case, the data of the return-less type gasoline supply system is described by a two-dot chain line for reference, the electric power consumption of the fuel pump 33 (the high-pressure fuel pump) is constituted only by the driving of the spill valve 31 in relation to the utilization of the driving force of the engine, the electric power consumption is small, however, the rotation of the pump synchronizes with the rotation of the engine. Accordingly, since the pump rotating speed is wholly higher than the present embodiment, and the time for the high rotation becomes longer in accordance with the high rotation of the engine, there tends to be generated a problem of the short service life of the fuel pump caused by the abrasion of the pump slidable portion, however, it is known that the problem is widely improved by the present embodiment.

In addition, since the fuel pump 3 is arranged outside the engine room 50, and the pressurizing piping in the downstream side of the fuel pump 3 is structured such as to satisfy the relation piping length (L)=piping inner diameter (d)×250 or more, it is possible to avoid the vaporization of the fuel in the upstream side of the fuel pump 3, and it is possible to achieve a stable and improved fuel supply amount by attenuating the pulsation of the fuel pressure.

As mentioned above, in accordance with the return-less type fuel supply system the present embodiment in which the driving of the fuel pump is feedback controlled on the basis of the fuel pressure detected near the injector, and the fuel pump is arranged outside the engine room, it is possible to avoid the wasteful driving of the fuel pump while avoiding the increase of the fuel temperature within the tank, it is possible to achieve a long service life of the fuel pump as well as minimizing the electric power consumption for driving the pump, and it is possible to maintain an improved fuel supply state by avoiding the vaporization of the fuel in the upstream side of the fuel pump.

What is claimed is:

1. A return-less type engine fuel supply apparatus comprising a fuel supply pipe line extended from a fuel tank and having an injector in a leading end side, a motor-driven fuel pump arranged in the fuel supply pipe line, and an electronic control unit drive controlling the fuel pump and the injector, and pressurizing a liquefied gas fuel stored in the fuel tank by the fuel pump so as to feed to the injector through the fuel supply pipe line and supply to the engine, wherein a pressure sensor detecting a fuel pressure so as to output to the electronic control unit is arranged at a position near the injector in the fuel supply pipe line where a fuel pressure approximately coincides with a fuel injection pressure, the electronic control unit feedback controls the operation of the fuel pump on the basis of the detected fuel pressure in such a manner that the fuel injection pressure maintains a predetermined target pressure, and the fuel pump is arranged outside an engine room.

2. An engine fuel supply apparatus as claimed in claim 1, wherein the fuel pump has a fuel discharge amount maintaining a fuel pressure just before an injection which fluctuates in accordance with a fluctuation of the engine rotating speed.

3. An engine fuel supply apparatus as claimed in claim 1, wherein a piping length of a pressurizing piping arranged in a downstream side of the fuel pump is equal to or more than piping inner diameter×250.

4. An engine fuel supply apparatus as claimed in claim 1, wherein the fuel pump is arranged in a trunk room near the fuel tank.

\* \* \* \* \*